United States Patent [19]

Petersen

[11] Patent Number: 4,558,938
[45] Date of Patent: Dec. 17, 1985

[54] TWIN ROTATABLE ELECTROMAGNETICALLY DRIVEN BLADE MECHANISM

[75] Inventor: Christian C. Petersen, Westwood, Mass.

[73] Assignee: Polaroid Corporation, Cambridge, Mass.

[21] Appl. No.: 566,309

[22] Filed: Dec. 28, 1983

[51] Int. Cl.[4] .............................................. G03B 9/12
[52] U.S. Cl. ................................. 354/234.1; 354/250
[58] Field of Search ............... 354/230, 234.1, 235.1, 354/247, 250, 261, 264, 265, 271.1

[56] References Cited

U.S. PATENT DOCUMENTS

| | | | |
|---|---|---|---|
| 2,476,576 | 7/1949 | Batchelder | 354/116 |
| 2,531,936 | 11/1950 | Fairbank et al. | 354/254 |
| 2,752,834 | 7/1956 | Fairbank | 354/147 |
| 3,533,346 | 10/1970 | Erlichman et al. | 354/234.1 |
| 3,545,352 | 12/1970 | Bellows | 354/459 |
| 3,557,678 | 1/1971 | Bellows | 354/258.1 |
| 3,781,099 | 12/1973 | Williams et al. | 352/141 |
| 3,782,255 | 1/1974 | Boerner | 354/454 |
| 3,882,522 | 5/1975 | Erlichman | 354/247 |
| 3,942,183 | 3/1976 | Whiteside | 354/436 |
| 4,024,552 | 5/1977 | Kondo | 354/234.1 |
| 4,033,693 | 7/1977 | Payrhammer et al. | 354/234.1 |
| 4,121,235 | 10/1978 | Fujita et al. | 354/234.1 |
| 4,265,530 | 5/1981 | Petersen | 354/235.1 |
| 4,325,614 | 4/1982 | Grimes | 354/437 |
| 4,333,722 | 6/1982 | Lee | 354/234.1 |
| 4,338,009 | 7/1982 | Lee | 354/152 |
| 4,348,092 | 9/1982 | Hirohata | 354/230 |

OTHER PUBLICATIONS

S. N. 506,787, C. C. Petersen, See Application, p. 3.

Primary Examiner—L. T. Hix
Assistant Examiner—David M. Gray
Attorney, Agent, or Firm—Leslie J. Payne

[57] ABSTRACT

There is disclosed an extremely thin electromagnetic rotatable shutter arrangement wherein a stationary magnetic arrangement is intermediate spaced apart portions of armature blades.

12 Claims, 2 Drawing Figures

TWIN ROTATABLE ELECTROMAGNETICALLY DRIVEN BLADE MECHANISM

BACKGROUND OF THE INVENTION

This invention relates generally to electromagnetic actuators and, in particular, electromagnetic actuators for driving blade mechanisms usable for photographic purposes or the like.

A wide variety of mechanical type actuators are known for use in driving blade mechanisms of cameras. U.S. Pat. Nos. 3,781,099; 3,782,255; and 3,942,183 are illustrative of different kinds of mechanically driven shutter arrangements. Many of such types rely upon a stored energy device, in the form of a mechanically tensioned spring, for driving the blades to open or closed conditions. While they function satisfactorily and provide commercially acceptable reliability, nonetheless, they have certain limitations.

For instance, sophisticated shutter mechanisms are of intricate construction and are, therefore, relatively costly and difficult to manufacture. Moreover, with the use of spring mechanisms the performance characteristics are relatively fixed. This is disadvantageous since their performance characteristics cannot be electronically programmable. Aside from this, the spring biased shutters have dynamic performance characteristics which are not as accurate or as reliable as they might otherwise be. Besides the foregoing drawbacks, they tend to be relatively large and somewhat bulky. Further, because of their complicated mechanical nature they are relatively easily susceptible to failure.

Recent efforts have aimed at improving upon such mechanisms. This is not only because of the limitations mentioned above, but also due to the desire to miniaturize cameras.

Some proposals have suggested using electromagnetic actuators for driving shutter blades. Many of these actuators employ annular field coils with magnetic armatures moving into and out of their cores. These too are considered bulky and, therefore, less than ideal for compact shutter applications.

Another approach is described in U.S. Pat. No. 4,024,552 which discloses shutter blades forming an integral part of the electromagnetic actuator itself. Despite a compact arrangement, such an actuator nevertheless relies upon springs for driving the blades to a terminal condition. In fact, a number of electromagnetic shutter mechanisms of this latter kind rely upon springs for driving the blades to at least a particular position. Exemplary are those disclosed in U.S. Pat. Nos. 4,333,722; 4,338,009; and 4,348,092. Moreover, spring mechanisms tend to bias the shutter blades so as to make them dynamically unstable. Therefore, such systems must typically employ latches to keep them in a stable condition.

Proposals have been put forth for springless shutter mechanisms. One is described in commonly-assigned U.S. Pat. No. 3,882,522. Essentially, this patent discloses use of a rotary type stepper motor for driving the shutter blades between open and closed orientations. Rotary stepper motors while being an improvement over the other kinds of conventional motors are still considered somewhat bulky for optimal miniaturization. Commonlyassigned U.S. Pat. No. 4,325,614 shows use of a rotary stepper motor for driving shutter blades. Another proposal is described in commonly-assigned U.S. Pat. No. 4,265,530 issued to the inventor of the instant application. This patent describes a system using not only a linear electromagnetic actuator, but an electro-magnetic clutching mechanism for intermittently transmitting the forces of the actuator to the shutter blades.

A further proposal for a springless type shutter is disclosed generally in U.S. Pat. No. 4,121,235. This patent discloses, however, an electromagnetic shutter mechanism using a pair of solenoids having relatively bulky annular field coils which when energized actuate a pair of shutter blades interconnected through a force transmitting lever.

A significant improvement over the foregoing type of actuator is described in commonly-assigned and co-pending application Ser. No. 506,787 filed June 22, 1983, by inventor of the instant application.

SUMMARY OF THE INVENTION

In accordance with the present invention there is provided an electromagnetically actuated blade mechanism of the type usable in a photographic apparatus for controlling scene radiation along a given path. Included is a pair of juxtaposed armature blade assemblies, each of said armature blades is mounted for rotation. Each has at least portions thereof in opposing spaced-apart relationship to each other so as to define a space therebetween. An aperture is formed in each blade wherein the apertures are movable to cooperate between unblocking and blocking conditions in response to counter-rotation of blades with respect to one another. Conducting means are coupled to each of the blades for movement therewith. These conducting means include active conducting segments which are selectively energizeable. A permanent magnetic arrangement is fixedly situated in a space intermediate the blades. Included in the permanent magnetic arrangement is means for producing at least a pair of magnetic fields. Each field faces away from the other and extends to corresponding active conducting portions on respective ones of the blades. These fields having respective polarities, such that when the active conducting segments are energized the blades counterrotate with respect to each other. By reversing the energization polarity the blades can move back and forth between unblocking and blocking conditions.

Among the objects of the invention are, therefore, the provision of an improved electromagnetic actuator for use in operating a blade mechanism of a photographic apparatus or the like; the provision of such an actuator having stationary permanent magnets intermediate a pair of counter rotating blade members; the provision of an actuator wherein the actuator is extremely thin and the rotating blades have apertures formed therein and, the provision of an actuator in which the blades remain in a stable condition following energization.

Other objects and further scope of applicability of the present invention will become apparent from the detailed description to follow when taken in conjunction with the accompanying drawings in which like parts are designated by like reference numerals.

DETAILED DESCRIPTION

Figure 1:
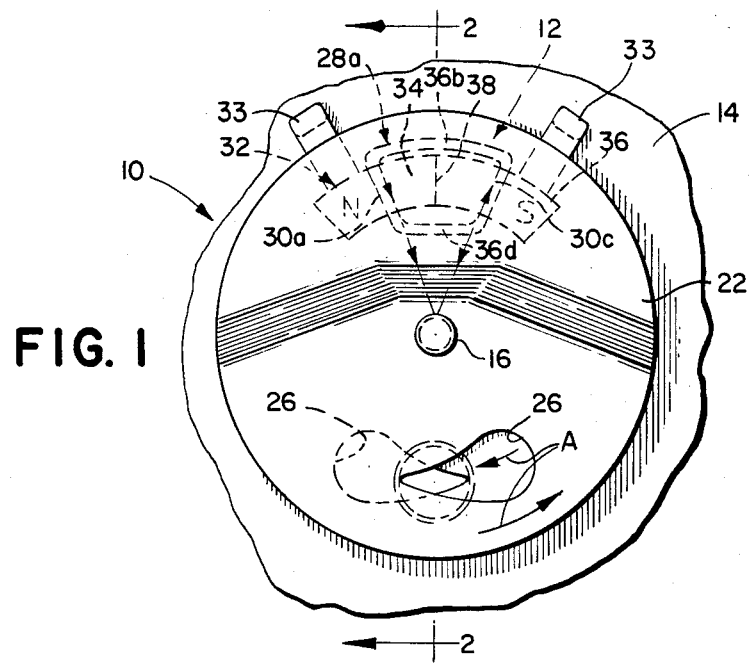
FIG. 1 is a side elevational view showing one embodiment of an electromagnetic blade or mechanism of the present invention in one condition of operation, and, FIG. 2 is a cross-sectional view taken along the section line 2—2 appearing in FIG. 1.
Figure 2:
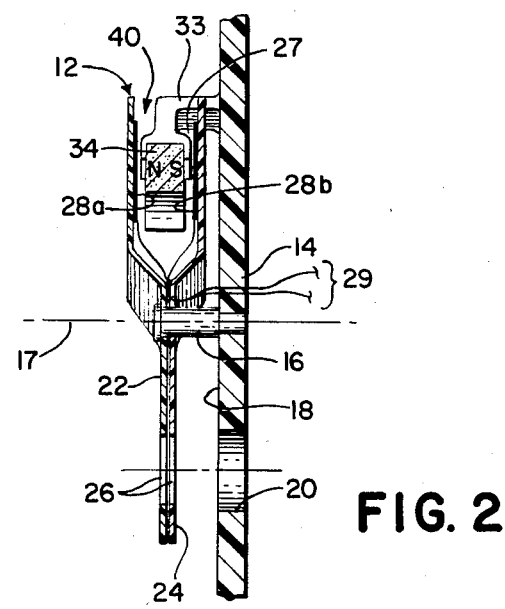

Reference is now made to FIGS. 1 and 2 of the drawings for illustrating one preferred embodiment of the present invention. As depicted there is shown a blade mechanism 10 of the so-called scanning type. The present blade mechanism 10 is adapted for use in exposure control situations for photographic apparatus (not shown). But, it should also be appreciated that the blade mechanism 10 may be used in other apparatus as well. For example, it can be used in machines preparing microfiche.

Included in with the blade mechanism 10 is an electromagnetic actuator 12 operable for driving the mechanism between scene light blocking and unblocking conditions. For effecting such blocking and unblocking operations, the electromagnetic actuator 12 is selectively energized in a manner which will be set forth.

There is provided a fixed block casting 14 which has connected there to a stub shaft 16. The shaft 16 is constructed to rotatably support components of the blade mechanism 10 about a common rotational axis 17. The block casting 14 defines a generally flat planar surface 18 having a light exposure opening 20 formed therethrough. This light exposure opening 20 defines the maximum light exposure aperture which permits passage of scene light to a photographic film unit (not shown). Control of exposure by the blade mechanism 10 can be effected by any suitable exposure control system, which is not shown since it does not form an aspect of the instant invention.

In this embodiment, the blade mechanism 10 includes a pair of thin armature blades 22, 24, in disc form. They are rotatable about their common rotational axis 17. Formed in respective ones of the thin armature blades 22, 24 is a generally tear-drop shaped exposure aperture 26. For defining aperture values which vary as a function of blade positioning during exposure, the exposure apertures 26 are arranged such that when the blades 22, 24 counter-rotate about the shaft 16 the exposure apertures 26 move between unblocking and blocking conditions over the exposure opening 20. In particular, they progressively coincide over the exposure opening 20 for defining the unblocking condition. In this embodiment, the armature blades 22, 24 are essentially made of a low mass opaque, non-magnetic and non-conducting plastic material.

In this particular embodiment, the armature blades 22 and 24 have their lower portions, which define the aperture 26, in intimate sliding contact with one another. This is for purposes of preventing scattering of scene light passing through the apertures. The opposite portions of these blades, however, are configured to flare away from the lower portion thereof in a fashion, such as shown in the drawings, that they define a uniform gap or space 27 therebetween. This gap 27 accomodates not only reception of a permanent magnetic arrangement as will be described, but also coil conducting arrangements 28a, b. The gap 27 serves as an air gap between the conducting coils and the permanent magnetic arrangement.

The coil arrangements 28a, b are generally planar and integrally connected to each of the discs 22, 24. Both of the coil arrangements 28 a, b are connected to a suitable source of electrical power (not shown), preferably direct current, through suitable electric leads 29 extending from the centerof the blades 22, 24. Each of the coil arrangements 28 a, b has a continuous looped and generally wedge shaped configuration, such as shown in FIG 1. Active conducting portions 30a, c. extend in a generally radial direction from the rotational axis 17. As will be pointed out, these portions are arranged to continuously stay within the different magnetic fields of the permanent magnetic arrangement 32 during rotation of the armature blades 22, 24. The magnetic arrangement 32 and the conducting portions 30a, c are arranged so that the generated electromagnetic forces are always at right angles to those portions. Arcuate conducting portions 30b, d fall outside the magnetic fields of the magnetic arrangement 32. Therefore, they do not contribute to the electromagnetic driving forces. For example, the conducting coil arrangements 28a, b can be formed on the external surface of the armature blades 22, 24 by known photofabrication techniques. This enhances the thinness and lightness of the blades. For instance, with such a technique, each coil would have a thickness of about 0.020 of an inch. Movement of the blade mechanism 10 is achieved through the simultaneous energization of the coil arrangements 28a, b. The control circuit (not shown) is arranged to send direct current through to the coils 28a, b in opposite directions. By reversing polarity. The generated electromagnetic forces can be accordingly reversed. It will be appreciated that when the coil arrangement has current flowing in one direction therethrough, the coil segments 30a, c have current flowing therethrough in opposite directions relative to each other. See FIG. 1. Thus, a single coil having one polarity can effectively interact with a pair of magnetic fields of opposite polarity produced by the magnetic arrangement to produce two forces driving in the same direction.

Reference is made in particular to the permanent magnetic arrangement 32. It is fixedly connected to the base block 14 by suitable mounting structure generally indicated by reference numeral 33. Of course the mounting structure 33 should not interfere with the rotational movement of the armature blades 22, 24. In this embodiment, it includes a pair of generally planar and accurately shaped permanent magnets 34, 36 such as seen in FIG. 1. They are placed in juxtaposed relationship to one another with a common boundary therebetween indicated at 38. Preferably, these magnets are of the rare earth type. The magnets 34, 36 are placed in the gap 27 intermediate the spaced-apart portions of the armature blades 22, 24; see FIG. 2. The magnet 34 has its upper surface with a north pole N, while its lower surface has a south pole S (FIG. 2). The magnet 36 has its upper surface with a south pole S, while its lower surface has a north pole (not shown). The magnetic strength of both magnets 34, 36 is generally the same. This is for facilitating generation of equal electromotive forces on the armature blades 22, 24 when the respective active conducting portions 30a, c are energized.

Operation of the blade mechanism 10 is achieved, as noted, through the energization of the coil arrangements 28a, b. For instance, initiation of coil energization can commence upon initiation of an exposure cycle. In such a situation the armature blades 22, 24 counter rotate such that their apertures move from a blocking condition (not shown) wherein the apertures do not coincide to a complete unblocking condition also not shown wherein the apertures coincide to define a maximum aperture. The armature blades are shown in FIG. 1 in transition between those two conditions, wherein the blades are moving from their unblocking to their blocking condition; as indicated by the arrow A.

When the coil arrangement 28a is energized, a given polarity flows in the coil segments 30a, c, such as, in the direction of the arrows. The opposing magnetic fields of the permanent magnets 34, 36 cooperate with the respective magnets and create electromagnetic forces having movement arms acting in the same direction which cause the armature blade 22 to rotate in the counterclockwise direction. Since the magnetic polarity of the magnets 34, 36 is reversed on the opposite side thereof facing the armature blade 24, a reversed current flow in coil 28b when viewed from the same side effects rotation of such armature blade in the opposite or clockwise direction. Thus, the blades 22, 24 counterrotate. Reversal of rotation of the armature blades 22, 24 can be effected by reversing the polarity traveling through the coil arrangements 28a, b. When the coils 28a, b are deenergized, the blades tend to remain in their positions. This is because of fact that the friction generated between the adjacent blades and with the shaft tend to hold these extremely low mass blades in position. In this embodiment, the blades are somewhat unbalanced because of the aperture being opposed to the coil. However, a balanced blade could be provided which would tend to overcome any unstableness created by the coil being positioned on one side of the axis. With a balanced blade the mass on opposite sides of the blade having the coil and the aperture would be equal.

As noted earlier, an electronic control circuit can control the flow of current to the coil arrangements. This allows the movement of the armature blades 22, 24 to be incremented for precise control. Although the present embodiment shows use of the blade mechanism as a rotatable scanning shutter type, it will be appreciated that the mechanism can be used as a plain shutter.

It will be appreciated that an extremely simple blade mechanism 10 is provided. For instance, the blade mechanism 10 can have a width which includes the gap 17 of about one-eighth of an inch or less. Although not shown, the armature blades can be provided with a Hall effect type sensor (not shown). Such a sensor would be put in the space between the coil segments 30a, c with leads from the sensor being input to the control circuit so that current to the coil arrangements 28a, b can be regulated.

Since certain changes may be made in the above described apparatus without departing from the scope of the invention herein involved, it is, intended that all matter contained in the discription or shown in the accompanying drawing shall be interpreted as illustrative and not in a limiting sense.

What is claimed is:

1. An electromagnetically actuated blade mechanism of the type usable in a photographic apparatus for controlling radiation along a given path comprising:

a pair of juxtaposed armature blade assemblies, each of said armature blades being mounted for rotation, each of said armature blades having at least portions thereof in opposing spaced-apart relationship to each other so as to define a space therebetween, each of said armature blades includes an aperture wherein said apertures are movable between unblocking and blocking conditions in response to counter-rotation of said armature blades with respect to one another;

conducting means coupled to each of said armature blades for movement therewith, each of said conducting means including a coil which is generally planar and parallel to said blade and has active conducting portions which are selectively energizeable; and, a permanent magnetic arrangement fixedly situated in said space intermediate said blade assemblies, said permanent magnetic arrangement including means for producing at least a pair of magnetic fields each one of which faces away from the other and extends to corresponding active conducting portions on respective ones of said armature blades, said fields having respective polarities, such that when said active conducting portions are energized said armature blades counter-rotate with respect to each other, whereby said apertures move between said unblocking and blocking conditions for controlling radiation along the path.

2. The invention of claim 1 wherein said field producing means produces two pairs of magnetic fields, each field of a respective pair of fields has alternate polarity with respect to the other field of the same pair and extend toward and encompasses a segment of said active conducting portions on respective ones of said armature blades, such that in response to energization of said conducting portions, each of said pairs of fields generate electromotive forces for rotationally driving its corresponding armature blade, whereby when said conducting portions on both of said armature blades are energized said blades counter-rotate with respect to each other so that said apertures can move between said unblocking and blocking conditions.

3. The invention of claim 2 wherein said armature blades are of low mass and are mounted for rotation about a common rotational axis.

4. The invention of claim 3 wherein each of said armature blades has its aperture diametrically opposed to its corresponding conducting means but opposite portions of each of said blades being of generally equal mass so as to allow said blades to remain stable when said conducting portions are deenergized.

5. The invention of claim 4 further including sensing means coupled to each of said blade members for sensing its corresponding pair of magnetic fields.

6. An electromagnetically actuated blade mechanism for controlling scene radiation along a given path in a photographic apparatus comprising:

a pair of juxtaposed armature blades mounted on a common axis for rotation, each of said armature blades having at least given portions thereof in opposing spaced-apart relationship to each other so as to define a space therebetween, the remaining portions of said blades including an aperture wherein said blades are rotatable to move said apertures between coincidence and non-coincidence with each other to thereby provide unblocking and blocking light conditions in response to counter-rotation of said armature blades with respect to one another;

conducting means coupled to each of said given portions of said blades for movement respectively therewith, each of said conducting means including a coil having an axis therethrough which is generally parallel to said common axis and has selectively energizable active conducting portions located on each of said blades; and, a planar permanent magnet arrangement fixedly situated in said space intermediate said given portions, said permanent magnet arrangement including means for producing at least a pair of magnetic fields each one of which faces away from the other and extend to corresponding active conducting portions on respective ones of said armature blades, said fields having respective polarities, such that when both said active conducting portions are energized said blades counter-rotate with respect to each other, whereby said apertures move between said unblocking and blocking conditions for controlling radiation through said apertures.

7. The invention of claim 6 wherein said field producing means produces two pairs of magnetic fields, directed to each planar side of said magnet arrangement, each field of a respective pair of fields has alternate polarity with respect to the other field of the same pair and extend toward and encompasses a segment of said active conducting portions on respective ones of said blades, such that in response to energization of said conducting portions, each of said pairs of fields generate electromotive forces for rotationally driving its corresponding blade, whereby when said conducting portions on both of said armature blades are energized said blades counterrotate with respect to each other so that said apertures can move between said unblocking and blocking conditions.

8. The invention of claim 7 wherein said armature blades are of low mass and are mounted for rotation about a common rotational axis.

9. The invention of claim 8 wherein each of said armature blades has its aperture diametrically opposed to its corresponding conducting means but opposite portions of each of said blades being of generally equal mass so as to allow said blades to remain stable when said conducting portions are deenergized.

10. The invention of claim 9 further including sensing means coupled to each of said blade members for sensing its corresponding pair of magnetic fields.

11. An electromagnetically actuated blade mechanism of the type usable in a photographic apparatus for controlling radiation along a given oath comprising:
a pair of juxtaposed armature blade assemblies, each of said armature blades being mounted for rotation, each of said armature blades having at least portions thereof in opposing spaced-apart relationship to each other so as to define a space therebetween, each of said armature blades includes an aperture wherein said apertures are movable between unblocking and blocking conditions in response to counter-rotation of said armature blades with respect to one another;
conducting means coupled to each of said armature blades for movement therewith, said conducting means including active conducting portions which are selectively energizeable;
a permanent magnetic arrangement fixedly situated in said space intermediate said blade assemblies, said permanent magnetic arrangement including means for producing at least a pair of magnetic fields each one of which faces away from the other and extends to corresponding active conducting portions on respective ones of said armature blades, said fields having respective polarities, such that when said active conducting portions are energized said armature blades counter-rotate with respect to each other, whereby said apertures move between said unblocking and blocking conditions for controlling radiation along the path, and,
each of said armature blades having portions including said apertures, said portions being in frictional engagement with each other, whereby said frictional engagement is sufficient to retain the blades in position relative to each other when said active conducting portions are deenergized.

12. An electromagnetically actuated blade mechanism for controlling scene radiation along a given path in a photographic apparatus comprising:
a pair of juxtaposed armature blades mounted on a common axis for rotation, each of said armature blades having at least given portions thereof in opposing spacedapart relationship to each other so as to define a space therebetween, the remaining portions of said blades including an aperture wherein said blades are rotatable to move said apertures between coincidence and non-coincidence with each other to thereby provide unblocking and blocking light conditions in response to counter-rotation of said armature blades with respect to one another;
conducting means coupled to each of said given portions of said blades for movement respectively therewith, said conducting means including selectively energizable active conducting portions located on each of said blades;
a planar permanent magnet arrangement fixedly situated in said space intermediate said given portions, said permanent magnet arrangement including means for producing at least a pair of magnetic field each one of which faces away from the other and extend to corresponding active conducting portions on respective ones of said armature blades, said fields having respective polarities, such that when both said active conducting portions are energized said blades counter-rotate with respect to each other, whereby said apertures move between said unblocking and blocking conditions for controlling radiation through said apertures; and,
wherein said remaining portions of said armature blades which carry said apertures are in sufficient frictional engagement with each other to retain the blades imposition relative to each other when said active conducting portions are deenergized.

* * * * *